Jan. 9, 1934.     H. U. BITTMAN     1,942,406
LINE GAUGE FOR TYPEWRITERS
Filed Feb. 14, 1933
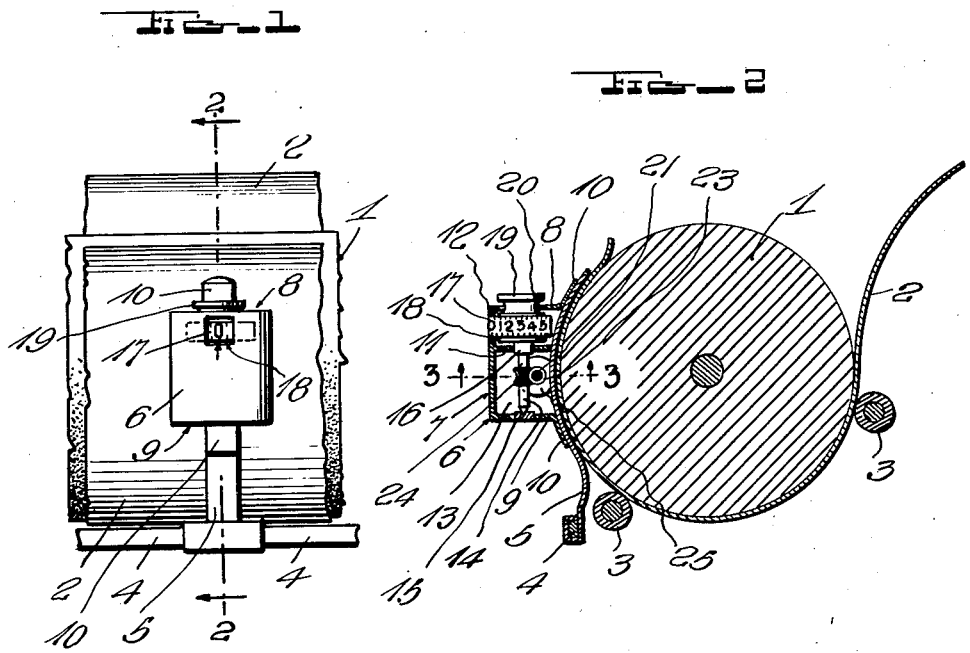
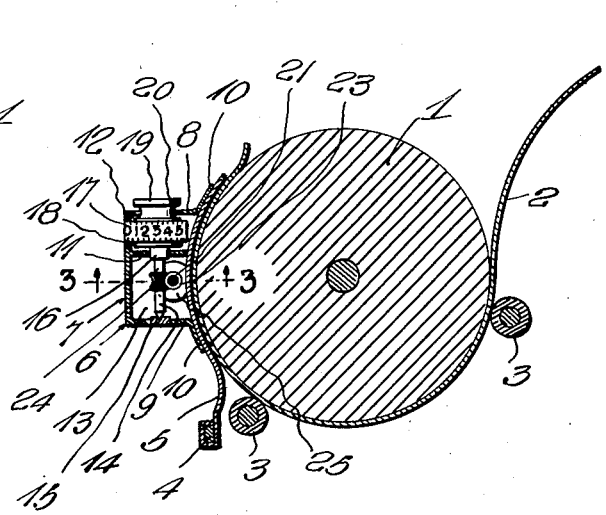
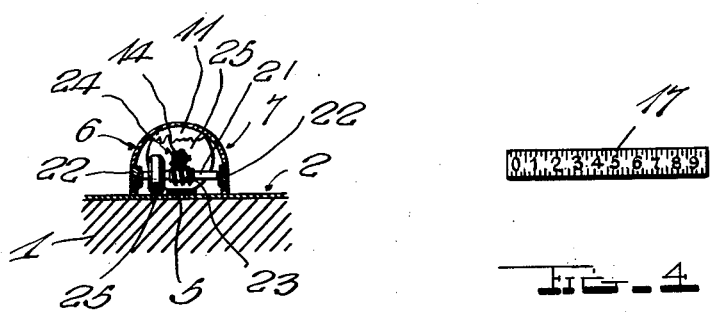
INVENTOR.
Harry U. Bittman,
BY Jacobi + Jacobi
ATTORNEYS.

Patented Jan. 9, 1934

1,942,406

UNITED STATES PATENT OFFICE 1,942,406

LINE GAUGE FOR TYPEWRITERS

Harry U. Bittman, Newark, N. J.

Application February 14, 1933. Serial No. 656,723

6 Claims. (Cl. 197—189)

This invention relates to typewriter attachments and more particularly to a line gauge and one object is to provide a gauge which when in use will indicate that a line of typing is a predetermined distance from the lower edge or upper edge of a sheet of paper and thereby prevent a typist from writing too far up or so far down upon a sheet of paper that there is not room for the ending of a letter and signature and also prevent the appearance of a sheet of typing being spoiled by writing so close to the lower edge of the paper that the last line will be irregular due to the paper not being properly held and slipping.

Another object of the invention is to provide a gauge of such construction that it may be carried by a paper holding strip forming a part of a typewriter of a standard construction and thereby serve as a paper holder and also as a line gauge.

Another object of the invention is to provide a device of this character wherein a drive wheel forming part of the gauge will be frictionally held in contact with the typewriter roller by resiliency of the strip carrying the gauge, thereby insuring operation of the gauge when the roller is turned to move the paper and also permitting the strip to be sprung away from the roller and the gauge set after a sheet of paper has been inserted in a typewriter and adjusted, or rotary motion manually imparted to the dial by merely gripping the knob and turning the same.

Another object of this invention is to provide a gauge which is very simple in construction, easy to adjust and accurate when in use.

Still another object of the invention resides in providing a construction which is simple and durable, inexpensive to manufacture and one which will be very efficient in use.

With these and numerous other objects in view, my invention consists in the novel features of construction, combination and arrangement of parts as will be hereinafter referred to and more particularly pointed out in the specification and claims.

The invention is illustrated in the accompanying drawing wherein:

Figure 1 is a front elevation showing a gauge of the improved construction applied to a typewriter of a conventional construction.

Figure 2 is a sectional view taken along the line 2—2 of Figure 1.

Figure 3 is a sectional view taken transversely through the gauge along the line 3—3 of Figure 2.

Figure 4 is a diagrammatic view showing the edge face of the dial extended flat.

This improved gauge is for use upon a typewriter of a conventional construction and in the accompanying drawing there has been shown a portion of the roller or platen 1 about which the paper 2 is guided by rollers 3. A bar or rod 4 extends longitudinally of the roller in parallel relation thereto and this bar carries a pair of resilient strips, one of which is shown and indicated by the numeral 5. These strips are slidable longitudinally upon the bar 4 in order that they may be moved into position to overlap side edge portions of a sheet of paper the proper distance and each is curved longitudinally as shown in Figure 2 and fits closely against the roller.

A gauge is carried by each strip 5 which serves not only as a gauge but also takes the place of a small roller usually carried by these strips and serving to hold the paper pressed firmly against the roller. The housing 6 of the gauge is formed of metal and has side walls 7, upper and lower walls or heads 8 and 9 from which extend attaching ears or tongues 10 welded or otherwise firmly secured to the strip 5, and a horizontally extending partition 11 dividing the interior of the housing into upper and lower compartments or chambers 12 and 13. A driven shaft 14 extends vertically in the housing with its lower end journaled in a thrust bearing 15 set into the lower head 9 and has an enlarged portion 16 forming an intermediate bearing rotatably received in a circular opening formed through the partition. The upper portion of the shaft carries a dial 17 in the form of a disk and this dial is located in the upper chamber 12 and has its marginal edge marked with numerals arranged consecutively from 0 to 9 as shown in Figure 4. This dial has its marginal portion exposed through a small opening 18 formed in the front of the housing and by referring to Figure 1 it will be seen that the opening is of such size that one numeral will be exposed at a time. Therefore when the shaft is rotated the numerals will be successively exposed and an accurate reading of the gauge will be possible. Above the dial the shaft carries a head or turning knob 19 which projects upwardly through an opening 20 formed in the upper head of the housing so that it may be readily grasped and the dial turned to rotate the same and manually set the same to a position in which the ordinal 0 is exposed through the sight opening. It will thus be seen that the dial rotates independently of the shaft when turned by hand.

The shaft is to be intermittently rotated in order to progressively move the numerals into position back of the sight opening and in order to do so there has been provided a drive shaft 21 which extends horizontally in the lower chamber of the housing and is rotatably mounted in bearings 22 carried by the side walls thereof. This drive shaft carries a worm 23 meshing with a worm gear 24 upon the driven shaft and also carries a friction wheel 25 held against the roller 1 by resiliency of the strip 5. By this arrangement the drive shaft will be rotated whenever the roller is turned to move the sheet of paper in the typewriter and the driven shaft and dial rotated a sufficient distance to bring another numeral into place back of the sight opening. By grasping the upper end of the strip 5 and springing this strip away from the roller the driven shaft may be grasped by its head or knob and rotated to set the dial after insertion of a sheet of paper and upon releasing the strip it will spring back towards the roller until the friction wheel bears against the paper. The dial may be set without springing the strip away from the roller, if so desired. Therefore, the friction wheel will take the place of the roller usually carried by the strip and serving to hold the paper firmly against the roller. By having the numerals of the dial carried by the driven shaft of one gauge extending in reverse order to numerals of the dial of the other gauge, the gauge carried by one of the resilient strips of the typewriter will register the number of lines of typing which have been written and the gauge carried by the other strip will register the number of lines the writing is from the lower edge of the paper or from the top of the paper. Therefore, the operator of the typewriter will always know the location of the line of typewriting relative to the lower edge or top edge of the sheet of paper and by predetermining the length of a short letter can properly locate it upon the paper or if a long letter or the like is being written can remove the sheet from the machine when the last line of writing is a determined distance from the lower edge or top edge of the sheet and therefore prevent danger of writing too close to the lower edge of the paper and spoiling the appearance of the sheet by having an uneven line of writing at the bottom due to the paper slipping.

It will thus be seen that this improved gauge will serve very effectively to indicate the location of a line of writing relative to the lower edge of a sheet of paper and also take the place of a rollers usually carried by the resilient strips forming part of a typewriter and serving to hold a sheet of paper firmly against the roller of the typewriter.

From the foregoing description of the construction of my improved apparatus, the application of the same to use will be readily understood. It will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to without departing from the spirit or sacrificing any of the principles of the invention.

Having thus described the invention what is claimed is:

1. In a typewriter, a roller, a resilient paper holding strip bearing against said roller, and a register carried by said strip and having a dial, an actuating wheel held against said roller by the resiliency of said strip, and means for transmitting motion from said wheel to said dial when the wheel is rotated by turning of the roller.

2. In a typewriter, a roller, a resilient paper holding strip bearing against said roller, and a register consisting of a housing carried by said strip and formed with a sight opening, a driven shaft rotatably mounted in said housing, a dial carried by said shaft and having a portion visible through the sight opening, a drive shaft rotatably mounted in said housing, a drive wheel carried by said drive shaft and having frictional engagement with said roller, and means for transmitting rotary motion from the drive shaft to said driven shaft.

3. In a typewriter, a roller, a resilient paper holding strip bearing against said roller, and a register consisting of a housing carried by said strip and formed with a sight opening, a driven shaft disposed vertically in said housing and rotatably mounted, a dial carried by said shaft and visible through the sight opening, a rotary drive shaft disposed horizontally in said housing and carrying a friction wheel bearing against said roller, and means for transmitting rotation from the drive shaft to said driven shaft.

4. In a typewriter, a roller, a resilient paper holding strip bearing against said roller, and a register consisting of a housing carried by said strip and formed with a sight opening, a driven shaft disposed vertically in said housing and rotatably mounted, a dial carried by said shaft and having an arcuate edge face marked with numerals visible through said sight opening, a rotary drive shaft disposed horizontally in said housing and carrying a friction wheel held against said roller by resiliency of said strip, a cooperating worm and gear carried by said shafts for transmitting rotation from the drive shaft to said driven shaft, and a knob at the upper end of said driven shaft projecting above said housing whereby the knob may be grasped and turned to set the dial.

5. In a typewriter, a roller, a resilient paper holding strip bearing against said roller, and a register consisting of a housing carried by said strip and formed with a sight opening, a driven shaft disposed vertically in said housing and rotatably mounted, a dial carried by said shaft and visible through the sight opening, a rotary drive shaft disposed horizontally in said housing and carrying a friction wheel bearing against said roller, means for transmitting rotation from the drive shaft to said driven shaft, and a knob at the upper end of said driven shaft projecting above said housing whereby the knob may be grasped and turned to set the dial.

6. In a typewriter, a roller, a paper holding strip normally bearing against said roller and movable away from the same, and a register carried by said strip and having a dial, an actuating wheel for said dial held against said roller when the strip is in its normal position to operate the register as the roller is turned, and means for moving said dial to a set position when the strip is moved away from the roller.

HARRY U. BITTMAN.